(12) United States Patent
Kobold

(10) Patent No.: US 11,431,421 B1
(45) Date of Patent: Aug. 30, 2022

(54) CAUSTIC EXPANDER AND LOCAL WAVEGUIDE TO IMPROVE ACOUSTIC COMMUNICATIONS

(71) Applicant: United States of America as represented by the Secretary of the Navy, Arlington, VA (US)

(72) Inventor: Michael Kobold, Indialantic, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 241 days.

(21) Appl. No.: 16/718,515

(22) Filed: Dec. 18, 2019

(51) Int. Cl.
*H04B 11/00* (2006.01)
*H04B 13/02* (2006.01)

(52) U.S. Cl.
CPC ............. *H04B 11/00* (2013.01); *H04B 13/02* (2013.01)

(58) Field of Classification Search
CPC .................... H04B 11/00; H04B 13/02
See application file for complete search history.

(56) References Cited

U.S. PATENT DOCUMENTS 7,510,150 B2* 3/2009 Williams ............... B64C 9/02
244/211
2020/0103966 A1* 4/2020 Khoshkava ........... A63F 13/285

FOREIGN PATENT DOCUMENTS

CA 2022926 A1 * 7/1991 ............. G01N 29/27
WO WO-2019222809 A1 * 11/2019 ........... G01V 1/3808

* cited by examiner

*Primary Examiner* — Isam A Alsomiri
*Assistant Examiner* — Abdallah Abulaban
(74) *Attorney, Agent, or Firm* — James T. Shepherd

(57) ABSTRACT

A system for improving acoustic communications in a shallow-water environment is provided. The system includes a pump, an elongated inflatable bladder and an acoustic communication modem and transducer. The pump forces water through the bladder, which creates a pumping current. This pumping current drives the sound speed profile up and down vertically, resulting in changes to shallow-water acoustic communication shadows and resultant improved acoustic communication. The bladder may be biased to return to a coiled shape after operation of the pump. The system may be mounted on a turntable to be able to direct the bladder in a preferred direction. Equipment can be attached to the end of the bladder and be transported with the uncoiling and recoiling of the bladder.

20 Claims, 2 Drawing Sheets

CAUSTIC EXPANDER AND LOCAL WAVEGUIDE TO IMPROVE ACOUSTIC COMMUNICATIONS

STATEMENT OF GOVERNMENT INTEREST

The invention described herein may be manufactured and used by or for the Government of the United States of America for governmental purposes without the payment of any royalties.

BACKGROUND OF THE INVENTION

(1) Field of the Invention

The present invention relates to underwater acoustic communications. More particularly, the present invention relates to expansion of the caustic, or envelope of rays from an acoustic projector, to change the shallow-water shadows in the underwater transmission.

(2) Description of the Prior Art

Robust and reliable horizontal long-range acoustic communications in a littoral water environment, i.e. a shallow-water depth environment, is known to be a very challenging task. Undersea acoustic communications can be interrupted by disturbances in the environment caused by fluctuations, or movements, of different layers in the water column. The layers are caused by differences in salinity, temperature, density, or other water properties, with the delineations between layers referred to as thermoclines.

Instabilities sometimes occur in the boundaries between these layers causing movement. This movement can have an adverse effect on the propagation of the acoustic signals, causing acoustic shadows and effectively blocking communications. This phenomenon can be particularly acute in the littoral region. Acoustic shadows can occur if, for example, cold river water splays out over the surface of a bay. This causes the acoustic communication wave fronts to be refracted upwards toward the lossy and interference producing waves and ripples on the surface.

The shallow water acoustic channel suffers from severe multi-path effects, Doppler spread, and signal delay variation. These impairments vary in time significantly. Various modulation schemes have been tried to improve acoustic communications. A first such approach is a set of orthogonal frequency division multiplex (OFDM) modulations in which data are transmitted by modulating a large number of orthogonal carriers. OFDM modulation copes well with multi-path effects, but still does not solve the Doppler problem. Furthermore, the tracking of the severe signal delay variation is a major problem in most communication systems.

A second approach is an application of DSSS (direct sequence spread spectrum) techniques where the transmitted symbols are spread over the used bandwidth with a pseudo-noise binary. Limitations in temporal coherence of the channel affect the maximum spreading factor and boundary instabilities may still interrupt communications.

Thus, a need exists for systems and methods for improving acoustic communications in a shallow-water environment. Systems and methods are needed to penetrate regions of shallow-water shadows caused by boundary instabilities.

SUMMARY OF THE INVENTION

It is therefore an object of this present invention to provide systems and methods to create a change in the sound speed profile in order to penetrate regions of shallow-water shadows. The systems and methods can generate internal wave fluctuations to affect the sound speed profile change.

The invention includes a shallow-water acoustic communication system including an acoustic modem, a transducer in connection with the modem and emitting an acoustic communication signal, a fluid pressure source and an elongated flexible bladder connected to an output of the fluid pressure source. A fluid flow from the output of the source is directed through the bladder to create a pumping current, which drives an up and down vertical action of a sound speed profile adjacent to and beyond the bladder. This action disrupts shallow-water acoustic communication shadows in the path of the communication signal, allowing for improved penetration through the shadows. A plurality of the systems can form an array, with each of the systems oriented in a differing direction. The array can be a two-dimensional array. When used in a grid, the plurality of systems can exploit recent developments in non-uniform array technology.

The fluid pressure source can be a pump or an accumulator containing a fluid under pressure. The bladder can be configured in a coiled shape prior to the fluid flow entering the bladder. The fluid flow through the bladder can uncoil the bladder. The bladder, itself, can be fabricated from a shape memory material, biased to return to the coiled shape after the fluid flow through the bladder is ended. Alternately, the shape memory material can include a separate coil of material attached to an edge of the bladder along a length of the bladder, or a separate coil of material incorporated into a cross-section of the bladder along a length of the bladder.

The system can include a turntable, with the fluid pressure source and bladder mounted thereon. The turntable can be rotatable about a vertical axis to orient the bladder along a desired direction. The modem and transducer can be mounted on the turntable to orient the acoustic communication signal in the desired direction. In this case, the bladder can act as a transmitting waveguide for the acoustic communication signal.

The system can include equipment attached at an end of the bladder distant from the fluid pressure source when the fluid flow extends the bladder. The equipment can be a second transducer, with the acoustic communication signal directed beyond the bladder. An acoustic communication signal received at the second transducer can be directed back through the bladder. In this case, the bladder can act as a receiving waveguide for the acoustic communication signal. The equipment may be removably attached at the end, such that the equipment can be deployed at the end location.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE INVENTION

Figure 1:
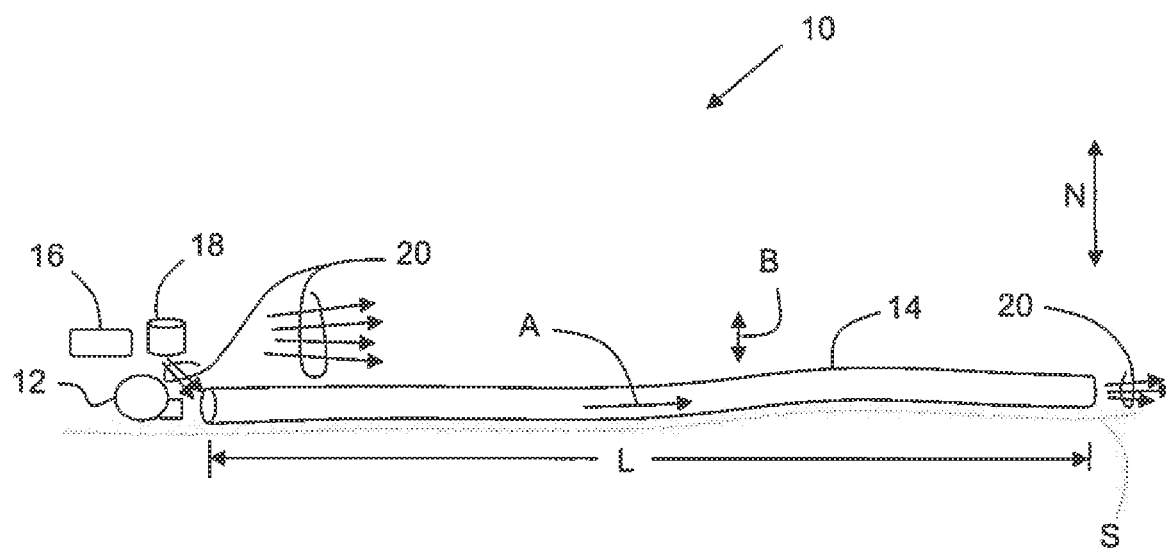
FIG. 1 illustrates a schematic view of a system for improving acoustic communications in a shallow-water environment.

Referring now to FIG. 1, there is shown a schematic view of shallow-water acoustic communications system 10. System 10 is shown deployed adjacent sea floor S (shown as dotted in FIG. 1 for clarity). System 10 includes hydraulic pump 12, bladder 14, acoustic modem 16 and transducer 18. The output of hydraulic pump 12 is connected to bladder 14 and pumps water through bladder 14. As water is pumped through bladder 14 (indicated by arrow A in FIG. 1), the horizontal flow oscillation of the water flowing through and exiting bladder 14 induces vertical oscillation of the water column (indicated by double arrow B in FIG. 1). The action is similar to the well-known "sky air dancer" inflatable tubes used in outdoor advertising, where air pumped vertically through a tube causes the horizontal oscillation of the tube. The water exiting tube 14 excites a different type of vertical oscillation, at a frequency commonly written as N, due to density imbalance.

As is known in the art, modem 16 and transducer 18 are used to produce acoustic signals for underwater communications. Bladder 14 provides the critical transport current for the caustic, or envelope of acoustic communication rays (illustrated as arrows 20 in FIG. 1) from modem 16 and transducer 18 along the trajectory towards an acoustic receiver (not shown). The key is to create a change in the sound speed profile with internal wave fluctuations in order to penetrate regions that are shallow-water shadows. Ordinarily, internal-wave action excites the vertical dimension, z. This vertical dimension might already be susceptible to instabilities that lead to changes at the Brunt-Väisälä frequency, N, where water parcels that were less dense become denser and have the potential to sink into, and past, gravitational equilibrium. N tends to change in time. Exciting these vertical currents can be done with horizontal currents in order to make a current circuit. On an oceanic scale these current circuits occur naturally via the Sverdrup and Ekman transport currents excited by oceanic gyres, which in turn are influenced by the Westerlies and Trade Winds as illustrated in FIG. 2.

Figure 2:
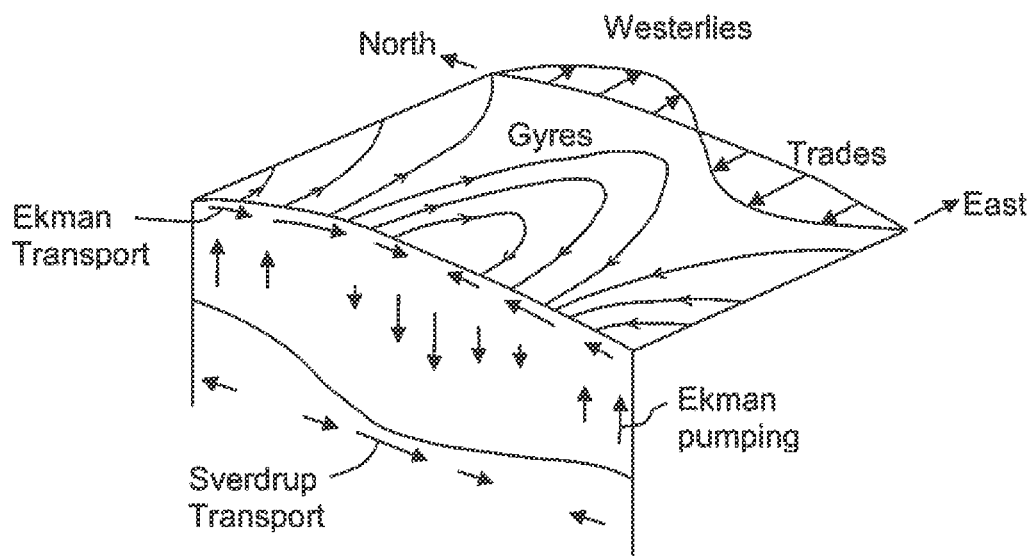
FIG. 2 illustrates ocean currents analogous to those driven by the system of FIG. 1.

As noted, bladder 14 provides the critical transport current for the creation of a pumping current that drives the sound speed profile up and down vertically, similar to the currents illustrated in FIG. 2. It is this vertical motion that distorts the wave front propagation in just the same way as do the internal waves, with the same change in vertical profile of the speed of sound c, as in:

$$\delta c(\vec{r}, t) = \left(\frac{dc(z)}{dz}\right)_p \varsigma(\vec{r}, t).$$

Here, the vector, r, points to the location of the water parcel at a time, t, which undergoes a vertical displacement zeta, ζ, which modifies the slope of the sound speed profile versus depth, z, to provide a speed variation, δc. The slope is a potential gradient, p, defined as the total gradient minus the adiabatic gradient. The change in the sound speed profile results from pump 12 inflating bladder 14 tube to deploy an unsteady flow of water around (above) and especially beyond bladder 14. In turn, the change in the sound speed profile results in changes to the shallow-water acoustic communication shadows, allowing for improved acoustic communication through these areas.

Figure 3:
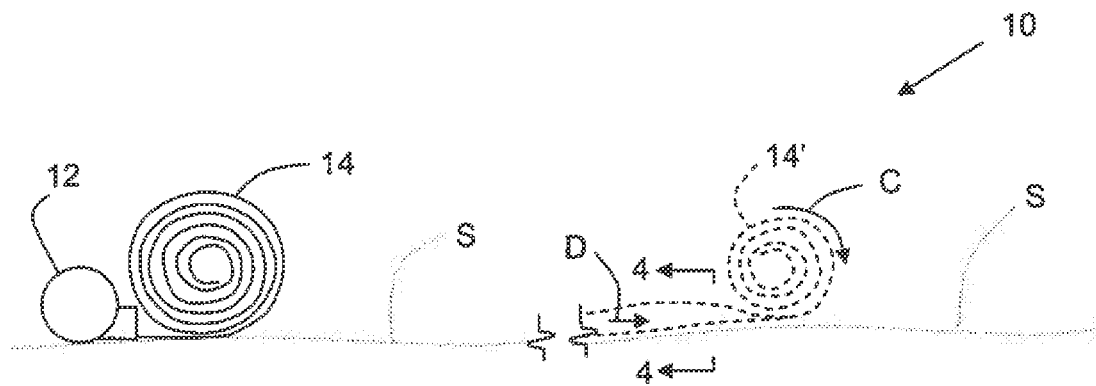
FIG. 3 illustrates a schematic view of the system of FIG. 1 having a multiple use feature.

When pump 12 is stopped, bladder 14 collapses due to the surrounding water pressure. Depending on the length of bladder 14, retrieval and re-deployment of system 10 can become cumbersome. Referring now to FIG. 3, there is shown a schematic view of system 10 having a feature making multiple uses more practical.

In FIG. 3, bladder 14 is shown to be in a coiled position prior to pump 12 being operated. For clarity, modem 16 and transducer 18 are not shown in FIG. 3. As pump 12 is operated and begins to pump water through bladder 14, bladder 14 begins to uncoil over sea floor S. A partially uncoiled position is illustrated in phantom in FIG. 3, with bladder 14' uncoiling as indicated by arrow C, and water flowing in bladder 14' in the direction of arrow D. When water is flowing completely through bladder 14, system 10 assumes the position shown in FIG. 1.

Once the operation of pump 12 is halted, bladder 14 can recoil to its previous position. Recoiling of bladder 14 can occur in numerous ways. For example, bladder 14 itself can be fabricated of a shape memory material, which will return to its original shape once water stops flowing through bladder 14.

Figure 4:
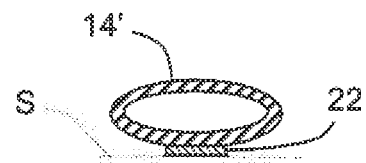
FIG. 4 illustrates a cross-sectional view of an element of the system of FIG. 3 taken at line 4-4 of FIG. 3.

As another example, FIG. 4 illustrates a cross-sectional view of bladder 14' taken at line 4-4 in FIG. 3. Bladder 14' can be fabricated of a non-shape memory, flexible material and a coil of shape memory material 22 can be attached along one side of bladder 14'. This would act similarly to the well-known party horns used to celebrate New Year's Eve, birthdays and the like.

Figure 5:
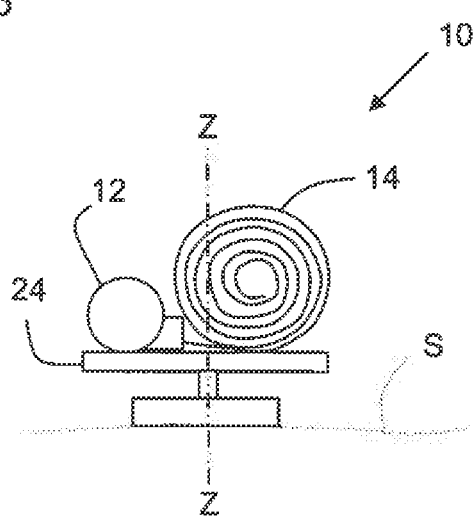
FIG. 5 illustrates a schematic view of the system of FIG. 1 incorporating a rotational feature.

Referring now to FIG. 5, there is shown yet another configuration of system 10, which further enhances multiple uses of system 10. Bladder 14 is shown in the coiled position in FIG. 5 and is mounted on turntable 24, which rests on sea floor S. For clarity, modem 16 and transducer 18 are not shown in FIG. 5. Turntable 24 can be rotated about axis Z-Z, such that bladder 14 can be deployed in virtually any direction. Initially, turntable 24 can be rotated to align and deploy bladder 14 along a first desired direction. Once communications have been completed in the first direction and pump 12 is stopped, bladder 14 will recoil itself onto turntable 24. Turntable 24 can then be rotated to a new direction and bladder 14 can be re-deployed along the new direction.

Figure 6:
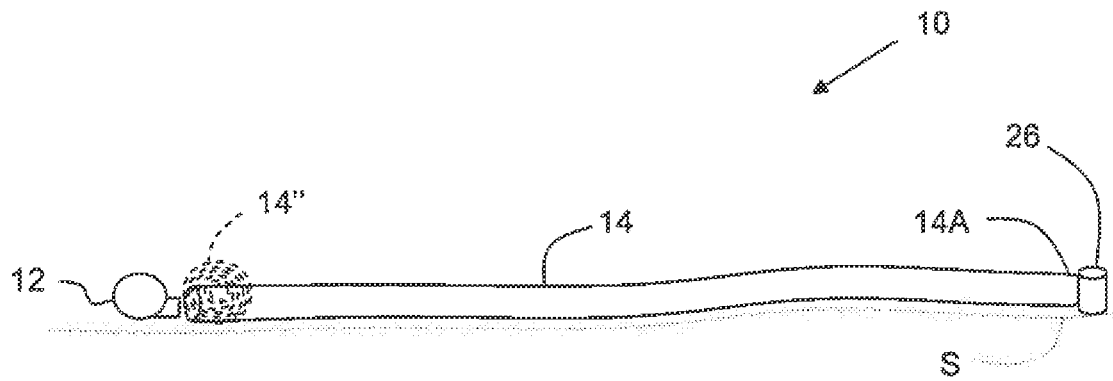
FIG. 6 illustrates a schematic view of the system of FIG. 1 for use as an equipment deployment means.

Referring now to FIG. 6, there is shown a schematic view of system 10 configured to deploy equipment 26. For clarity, modem 16 and transducer 18 are not shown in FIG. 6. Bladder 14 is shown in the fully deployed position in FIG. 6. Equipment 26 is attached to end 14A of bladder 14. Prior to deployment, bladder 14 would be in the coiled position (shown in phantom as bladder 14" in FIG. 6). As pump 12 is operated, bladder 14 uncoils, as described previously with relation to FIG. 3, and equipment 26 is carried along with end 14A of bladder 14. When bladder 14 is partially or fully uncoiled, equipment 26 can be detached from end 14A of bladder 14 to remain at the deployed position on sea floor S. Alternately, equipment 26 can remain attached to end 14A of bladder 14 and be retrieved when bladder 14 returns to its coiled position.

What has thus been described is a system (10) for improving acoustic communications in a shallow-water environment. The system (10) includes a pump (12), an elongated inflatable bladder (14) and an acoustic communication modem (16) and transducer (18). The pump (12) forces water through the bladder (14), which creates a pumping current.

This pumping current drives the sound speed profile up and down vertically. The change in the sound speed profile results in changes to the shallow-water acoustic communication shadows. The changes to the shallow-water acoustic communication shadows allow the modem (16) and transducer (18) to have improved acoustic communication through these areas.

The bladder (14) may be biased to return to a coiled shape once the pump (12) ends pumping. The biasing can result from the bladder (14) being fabricated of shape memory material. Alternately, the bladder (14) may be fabricated of a more flexible material and a shape memory material (22), such as a plastic or metal, can be incorporated into one or two edges of the bladder (14).

The system (10) may include a turntable (24), to which at least the pump (12) and the bladder (14) can be mounted. Preferably, but not necessarily, the modem (16) and transducer (18) may also be mounted on the turntable (24). Once the system (10) is disposed on the sea floor (S), the turntable (24) can be rotated to a preferred direction, such that the bladder (14) will extend along the preferred direction when deployed.

Equipment (26) can be attached to the end (14A) of the bladder (14) and be transported with the uncoiling and recoiling of the bladder (14). The equipment (26) can be releasably attached to the end (14A) of the bladder (14), such that the equipment (26) can be deployed at a desired position along the length of the uncoiling or coiling bladder (14).

Obviously, many modifications and variations of the present invention may become apparent considering the above teachings. For example, shape memory material 22 (illustrated in FIG. 4 as attached to bladder 14') can be fabricated into the cross-section of bladder 14'.

In another example, equipment 26 may be a transducer, which can be deposited at end 14A of uncoiled bladder 14. Uncoiled bladder 14 can then be used as a waveguide, wherein the acoustic communications from modem 16 and transducer 18 can be directed through bladder 14. In this manner, secure communications can occur between modem 16 and transducer 18 near pump 12 and transducer equipment 26 at end 14A remote from pump 12. Likewise, acoustic communications can be directed back through bladder 14, such that uncoiled bladder 14 can be used as a receiving waveguide for secure communications.

Length L of bladder 14 (as shown in FIG. 1), as well as the materials comprising bladder 14, can vary depending on the desired acoustic communication range. For short range communication, length L can be in the range of 10 to 30 meters. For longer range communication, length L can be in the range of 100 meters or more.

In a further variation, a hydraulic accumulator can be used in lieu of pump 12. The accumulator would hold water or other fluid under pressure, with the outlet of the accumulator connected to bladder 14. Once activated, the accumulator would provide the flow through bladder 14, similar to the flow from pump 12. Since the accumulator normally would be a single use device, bladder 14 need not be coiled, such that no shape memory material is needed.

In a still further variation, a series of systems 10 can allow for spatial reconfiguration of an array. Electronic steering requires a wider main lobe in order to avoid having another major lobe appear within 90 degrees of the desired steered main lobe. In this case the directional factor for a line array of $N_e$ elements steered in the direction $\theta_0$ is $$H(\theta) = \frac{1}{N_{el}} \frac{\sin[(N_e/2)kd(\sin\theta - \sin\theta_0)]}{\sin[(1/2)kd(\sin\theta - \sin\theta_0)]},$$

which for a narrow main lobe introduces "side" lobes that are of the same magnitude as the main lobe. Here $k=2\pi/\lambda=2\pi$ f/c. Spatial reconfiguration allows the user to maintain thinner beamwidth without these undesirable effects by setting $\theta_0=0$, providing some stealth in a broadcasting environment.

Another advantage of the spatial reconfiguration of the two-dimensional grid array is to "sidestep" shadows of finite azimuthal extent. For example, the upwelling sound speed profile due to cold river flow into a bay, as previously discussed, is likely to produce a shadow along the channel of moving water in the otherwise relatively still bay water. By orienting bladder 14 away from the channel so that transducer equipment 26 are outside the channel, the shadow can be circumvented.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A shallow-water acoustic communication system, comprising:
    a fluid pressure source;
    an elongated flexible bladder displaced in a horizontal position and connected to an output of said fluid pressure source;
    a fluid flow from said output directed through said bladder, a distal end of said bladder configured for said flow to exit said bladder, said bladder configured to oscillate in a vertical direction driving an up and down vertical action of a sound speed profile adjacent to and beyond said bladder;
    an acoustic modem;
    a transducer; and
    an acoustic communication signal emitted in a direction along said bladder by said transducer in connection with said modem, said vertical action disrupting shallow-water acoustic communication shadows to improve penetration of said acoustic signal through said shadows.

2. The system of claim 1, wherein said fluid pressure source is a pump.

3. The system of claim 2, wherein said bladder is configured in a coiled shape prior to said fluid flow entering said bladder, said fluid flow through said bladder uncoiling said bladder.

4. The system of claim 3, wherein said bladder comprises a shape memory material, said material biased to return to said coiled shape after said fluid flow through said bladder is ended.

5. The system of claim 4, wherein said shape memory material comprises a separate coil of material attached to an edge of said bladder along a length of said bladder.

6. The system of claim 4, wherein said shape memory material comprises a separate coil of material incorporated into a cross-section of said bladder along a length of said bladder.

7. The system of claim 4, further comprising a turntable, said fluid pressure source and bladder mounted thereon, said turntable rotatable about a vertical axis to orient said bladder along a desired direction.

8. The system of claim 7, wherein said modem and transducer are mounted on said turntable to orient said acoustic communication signal in said desired direction.

9. The system of claim 7, further comprising equipment attached at an end of said bladder, said end distant from said fluid pressure source when said fluid flow extends said bladder.

10. The system of claim 9, wherein said equipment is a second transducer and said acoustic communication signal is directed through said bladder, said bladder acting as a waveguide for said acoustic communication signal.

11. The system of claim 9, wherein said equipment is removably attached at said end.

12. The system of claim 1, wherein said fluid pressure source is a fluid accumulator having a pressurized fluid therein.

13. The system of claim 12, wherein said bladder is configured in a coiled shape prior to said fluid flow entering said bladder, said fluid flow through said bladder uncoiling said bladder.

14. The system of claim 13, wherein said bladder comprises a shape memory material, said material biased to return to said coiled shape after said fluid flow through said bladder is ended.

15. The system of claim 14, further comprising a turntable, said fluid pressure source and bladder mounted thereon, said turntable rotatable about a vertical axis to orient said bladder along a desired direction.

16. The system of claim 15, wherein said modem and transducer are mounted on said turntable to orient said acoustic communication signal in said desired direction.

17. The system of claim 15, further comprising equipment attached at an end of said bladder, said end distant from said fluid pressure source when said fluid flow extends said bladder.

18. The system of claim 17, wherein said equipment is a second transducer and said acoustic communication signal is directed through said bladder, said bladder acting as a waveguide for said acoustic communication signal.

19. The method of claim 1, further comprising a turntable, said fluid pressure source and bladder mounted thereon, said turntable rotatable about a vertical axis to orient said bladder along a desired direction.

20. The system of claim 19, further comprising equipment attached at an end of said bladder, said end distant from said fluid pressure source when said fluid flow extends said bladder.

* * * * *